C. B. SHELDON.
Furniture-Casters.
No. 164,226. Patented June 8, 1875.
Fig. 1.
Fig. 4.
Fig. 3.
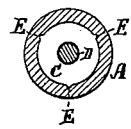
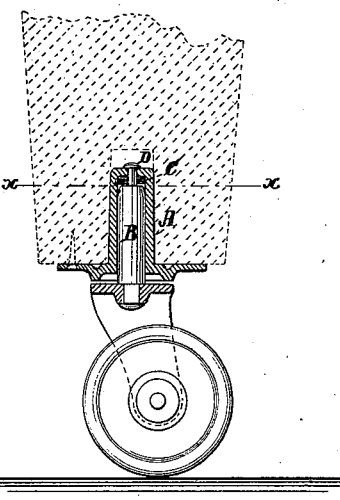
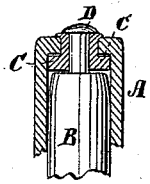
Fig. 2.
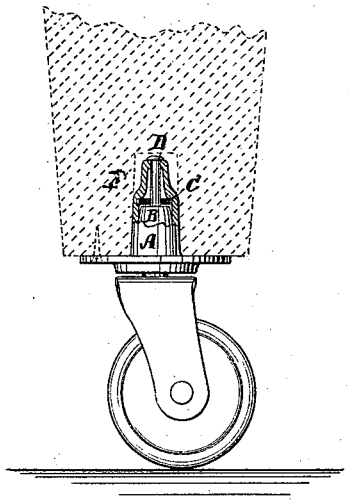
WITNESSES:
A. Bennerendorf
A. F. Terry
INVENTOR:
C. B. Sheldon
BY
Munn
ATTORNEYS.

UNITED STATES PATENT OFFICE.

CEVEDRA B. SHELDON, OF NEW YORK, N. Y.

IMPROVEMENT IN FURNITURE-CASTERS.

Specification forming part of Letters Patent No. 164,226, dated June 8, 1875; application filed April 17, 1875.

CASE O.

*To all whom it may concern:*

Be it known that I, CEVEDRA B. SHELDON, of the city, county, and State of New York, have invented a new and useful Improvement in Furniture-Casters, of which the following is a specification:

The object of this invention is to contrive a stamped spindle-socket, so as to bear the weight of the load on the top of the spindle by the bottom of the socket, which, as ordinarily arranged, it is incapable of, because the metal is so soft to facilitate the stamping that it will not stand the wear, and in the stamped article the metal is necessarily too thin to wear very long, however hard it might be made by the stamping process, whereas the cast-metal socket may be made sufficiently thick and hard to sustain the wear.

The invention consists in the improvement of furniture-casters by securing a bush or washer in the socket, by the spindle end passing through and riveted above it, and also by constructing a shoulder for the washer or bush formed in the socket by a contraction of the upper end thereof, the spindle passing through and riveted above it.

Figures 1, 2, and 3 are sectional elevations of stamped spindle-sockets, having a steel wearing bush or washer in the bottom to sustain the wear caused by the top of the spindle on which the bottom rests; and Fig. 4 is a horizontal section of Fig. 1 on line *x x*.

Similar letters of reference indicate corresponding parts.

A is the stamped socket; B, the spindle, and C the wearing bush or washer; and D is the pin going up through the washer and the top of the socket, to be headed down to fasten the parts together. This washer may be a mere flat ring or disk, as in Figs. 1 and 2, or it may have an extension up through the socket, as in Fig. 3, to be headed down a little, to fasten it against turning. In case it consists of a disk merely it may have one or more slight points, to press into the wall of the socket a little, as indicated in Fig. 4 at E, to prevent turning.

Having thus described my invention, I claim as new and desire to secure by Letters Patent—

1. The combination, with spindle and spindle-shaft, of bush or washer C, secured in the socket by the spindle end passing through the same, and riveted above, as and for the purpose described.

2. The shoulder for washer or wearing-bush, formed in the socket by a contraction, F, at the upper end thereof, the spindle passing through and riveted above the socket, as and for the purpose specified.

CEVEDRA B. SHELDON.

Witnesses:
T. B. MOSHER,
ALEX. F. ROBERTS.